(12) United States Patent
Takamuku et al.

(10) Patent No.: US 10,396,895 B2
(45) Date of Patent: Aug. 27, 2019

(54) COMPENSATION COEFFICIENT CALCULATION METHOD

(71) Applicant: NTT ELECTRONICS CORPORATION, Yokohama-shi, Kanagawa (JP)

(72) Inventors: Tomohiro Takamuku, Kanagawa (JP); Etsushi Yamazaki, Kanagawa (JP); Yuki Yoshida, Kanagawa (JP); Katsuichi Oyama, Kanagawa (JP); Yasuharu Onuma, Kanagawa (JP); Akihiro Yamagishi, Kanagawa (JP)

(73) Assignee: NTT ELECTRONICS CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 16/069,852

(22) PCT Filed: Apr. 26, 2017

(86) PCT No.: PCT/JP2017/016467
§ 371 (c)(1),
(2) Date: Jul. 12, 2018

(87) PCT Pub. No.: WO2017/208686
PCT Pub. Date: Dec. 7, 2017

(65) Prior Publication Data
US 2019/0036613 A1     Jan. 31, 2019

(30) Foreign Application Priority Data

Jun. 3, 2016  (JP) ................................ 2016-112001

(51) Int. Cl.
*H04B 10/2507*  (2013.01)
*H04B 3/10*  (2006.01)
(Continued)

(52) U.S. Cl.
CPC .......... *H04B 10/2507* (2013.01); *H04B 3/10* (2013.01); *H04B 10/0775* (2013.01);
(Continued)

(58) Field of Classification Search
None
See application file for complete search history.

(56) References Cited

U.S. PATENT DOCUMENTS

2014/0037291 A1   2/2014  Yan et al.
2015/0372766 A1*  12/2015  Yoshida ............. H04B 10/2507
                                            398/193

FOREIGN PATENT DOCUMENTS

JP    2011-211516 A    0/2011
JP    H02-252321 A    10/1990
(Continued)

OTHER PUBLICATIONS

International Preliminary Report on Patentability issued from the International Bureau in counterpart International Application No. PCT/JP2017/016467, dated Dec. 4, 2018.
(Continued)

*Primary Examiner* — Casey L Kretzer
(74) *Attorney, Agent, or Firm* — Myers Wolin, LLC (57) ABSTRACT

In a method in which a compensation coefficient calculating portion (6) calculates a compensation coefficient of a compensation portion (5) which compensates transmission characteristics of a signal, a known signal is extracted from the signal. Next, a pseudo-random number is added to the extracted known signal. Next, the compensation coefficient is calculated by comparing a true value of the known signal with the known signal to which the pseudo-random number is added.

11 Claims, 7 Drawing Sheets

(51) Int. Cl.
*H04B 10/61* (2013.01)
*H04L 27/01* (2006.01)
*H04L 27/26* (2006.01)
*H04B 10/077* (2013.01)

(52) U.S. Cl.
CPC .......... *H04B 10/61* (2013.01); *H04B 10/616* (2013.01); *H04L 27/01* (2013.01); *H04L 27/26* (2013.01); *H04B 2210/074* (2013.01); *H04B 2210/252* (2013.01)

(56) References Cited

FOREIGN PATENT DOCUMENTS

| JP | 2014-511076 A | 5/2014 | | |
|---|---|---|---|---|
| JP | 2015-122632 A | 7/2015 | | |
| WO | WO-2014126132 A1 | * | 2/2014 | ............. H04B 10/61 |

OTHER PUBLICATIONS

International Search Report and Written Opinion dated Aug. 1, 2017 issued in International Application No. PCT/JP2017/016467.
Kubo, Hirotsugu et al. "8 Demodulation Technique" The Knowledge Base of the Institute of Electronics, Information, and Communication Engineers, Ver. 1, pp. 1-13, Nov. 2010 (with partial English translation).
Extended European search report with supplementary European search report and the European search opinion issued by the European Patent Office for corresponding European Patent Application No. 17806246.9, dated Jun. 6, 2019.

\* cited by examiner

COMPENSATION COEFFICIENT CALCULATION METHOD

CROSS-REFERENCE TO RELATED APPLICATIONS

This application is a 35 U.S.C. § 371 National Phase of PCT Application No. PCT/JP2017/016467 filed Apr. 26, 2017, which claims priority to Japanese Application No. JP 2016-112001 filed Jun. 3, 2016. The disclosures of each of these prior applications are hereby incorporated by reference herein.

FIELD

The present invention relates to a method in which, in data communication, a compensation coefficient calculating portion calculates a compensation coefficient of a compensation portion which compensates transmission characteristics of a signal.

BACKGROUND

In coherent optical communication, large-capacity transmission at tens of Gbits/s or higher is realized by compensating for distortion of a transmission signal in digital signal processing. On the transmission side, transmission characteristics of a transmission circuit can be compensated for in advance by digital signal processing. Further, on the reception side, chromatic dispersion, polarization multiplexing/separation, polarization dispersion, frequency/phase fluctuation and the like caused in an optical fiber transmission path or a reception circuit can be compensated for by digital signal processing.

In the digital signal processing, adaptive equalization for continuously adaptively performing compensation for an environment of a transmission path which changes with time is one of the most important functions. Improvement of higher compensation accuracy of the function is demanded in order to realize a larger capacity.

The compensation portion which compensates for transmission characteristics of a signal is generally configured with a digital filter, and, by setting such a tap coefficient that can offset distortion of a transmission signal, for the digital filter, it is possible to perform compensation on the transmission signal. Therefore, accuracy of the compensation depends on appropriateness of the tap coefficient. Especially, for adaptive equalization on the reception side, various algorithms are proposed.

For example, PTL 1 proposes, as a method for equalizing transmission characteristics on the reception side in an orthogonal frequency division multiplexing (OFDM) system, a method in which a butterfly type filter is used to calculate a filter coefficient of the filter from known pilot frequency data using a minimal mean square error (MMSE) method. By calculating an inverse matrix of a result of multiplication with a complex conjugate transpose of a transmission signal by Formula (7) of PTL 1, a filter coefficient for horizontally polarized wave and a filter coefficient for vertically polarized wave can be determined. Further, NPL 1 introduces a general MSE algorithm.

Figure 8:
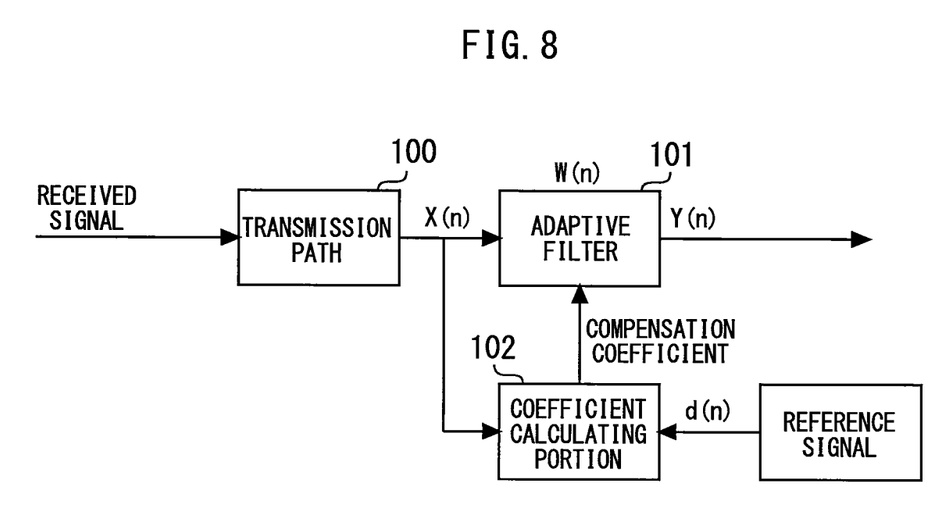
FIG. 8 is a diagram showing a conventional adaptive equalization apparatus.

FIG. 8 is a diagram showing a conventional adaptive equalization apparatus. A received signal which has passed a transmission path 100 such as an optical fiber has transmission characteristics. An adaptive filter 101 is a compensation portion which compensates for the transmission characteristics and is generally configured with an FIR filter. It is possible to, by setting a tap coefficient for the FIR filter, compensate for distortion and the like caused in the transmission path 100. Further, if the transmission path 100 is thought to be a characteristic of an amplifier and the like on the transmission side, it is also possible to compensate for distortion of an output signal of the amplifier in advance.

A coefficient calculating portion 102 uses a minimal mean square error method as an algorithm for calculating the tap coefficient. An error e(n) between an output of the adaptive filter 101 and a known signal sequence (referred to as a reference signal) is expressed by the following equation:

$$e(n) = d(n) - Y(n) = d(n) - W(n)^T X(n)$$

Here, d(n) indicates the reference signal; Y(n) indicates the output of the adaptive filter; W(n) indicates a tap coefficient of the adaptive filter; T indicates a transposed matrix; and X(n) indicates a received signal which has passed a transmission path.

In order to remove uncertainty of signs, what is obtained by averaging squared errors is set as an index MSE.

$$MSE = E[e(n)^2] = E[(d(n) - W(n)^T X(n))^2]$$

A solution of the tap coefficient of the filter when the above value is minimized is generally known as a winner solution and is determined by the following equation. Here, −1 indicates an inverse matrix.

$$W(n) = (X(n)^T X(n))^{-1} X(n)^T d(n)$$

CITATION LIST

Patent Literature

[PTL 1] JP 2014-511076 A

Non Patent Literature

[NPL 1] The institute of Electronics, Information and Communication Engineers (IEICE); Knowledge base; Chapter 8, Demodulation Technology

SUMMARY

Technical Problem

The above equation shows that a tap coefficient can be calculated from the received signal X(n) and the reference signal d(n) for the received signal X(n). However, in order to determine such a tap coefficient that an error is minimized, it is necessary to calculate an inverse matrix. When a filter configuration is complicated, there may be a case where, at the time of determining the inverse matrix, a value does not converge but diverges. Especially, the closer to a nyquist condition a received waveform is (the smaller inter-symbol interference is), the more easily the coefficient diverges. Furthermore, in this case, there may be a case where an unnecessary high-frequency component is raised in the FIR filter. Therefore, there is a problem that the filter coefficient cannot be certainly determined, and equalization accuracy decreases.

The present invention has been made to solve the problem as described above, and an object is to obtain a compensation coefficient calculation method in which a compensation coefficient for compensating for transmission characteristics of a signal can be certainly calculated, and equalization accuracy can be improved.

Solution to Problem

A compensation coefficient calculation method according to the present invention in which a compensation coefficient calculating portion calculates a compensation coefficient of a compensation portion which compensates transmission characteristics of a signal, includes: a step of extracting a known signal from the signal; a pseudo-random number adding step of adding a pseudo-random number to the extracted known signal; and a coefficient calculating step of calculating the compensation coefficient by comparing a true value of the known signal with the known signal to which the pseudo-random number is added.

Advantageous Effects of Invention

The present invention makes it possible to certainly calculate a compensation coefficient for compensating for transmission characteristics of a signal, and improve equalization accuracy.

DESCRIPTION OF EMBODIMENTS

A compensation coefficient calculation method according to the embodiments of the present invention will be described with reference to the drawings. The same components will be denoted by the same symbols, and the repeated description thereof may be omitted.

First Embodiment

Figure 1:
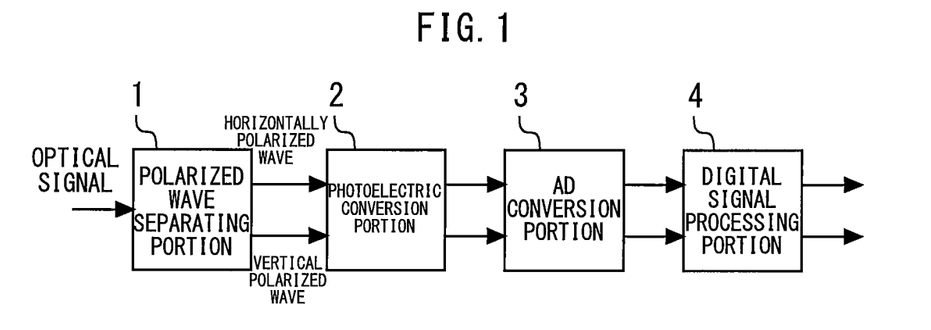
FIG. 1 is a diagram showing a communication apparatus according to a first embodiment of the present invention.

FIG. 1 is a diagram showing a communication apparatus according to a first embodiment of the present invention. This communication apparatus is a digital coherent optical receiver which receives an optical signal transmitted from the transmission side.

A polarized wave separating portion 1 separates an optical signal into a horizontally polarized wave and a vertical polarized wave. A photoelectric conversion portion 2 converts the set of optical signals to analog electrical signals. An AD (Analog to Digital) conversion portion 3 converts the set of analog electrical signals to a set of digital electrical signals by sampling the set of analog electrical signals at a predetermined frequency. A digital signal processing portion 4 restores (demodulates) transmit data by performing digital signal processing for received signals which are the digital electrical signals outputted from the AD conversion portion 3. The digital signal processing portion 4 has an adaptive equalization apparatus described below.

Figure 2:
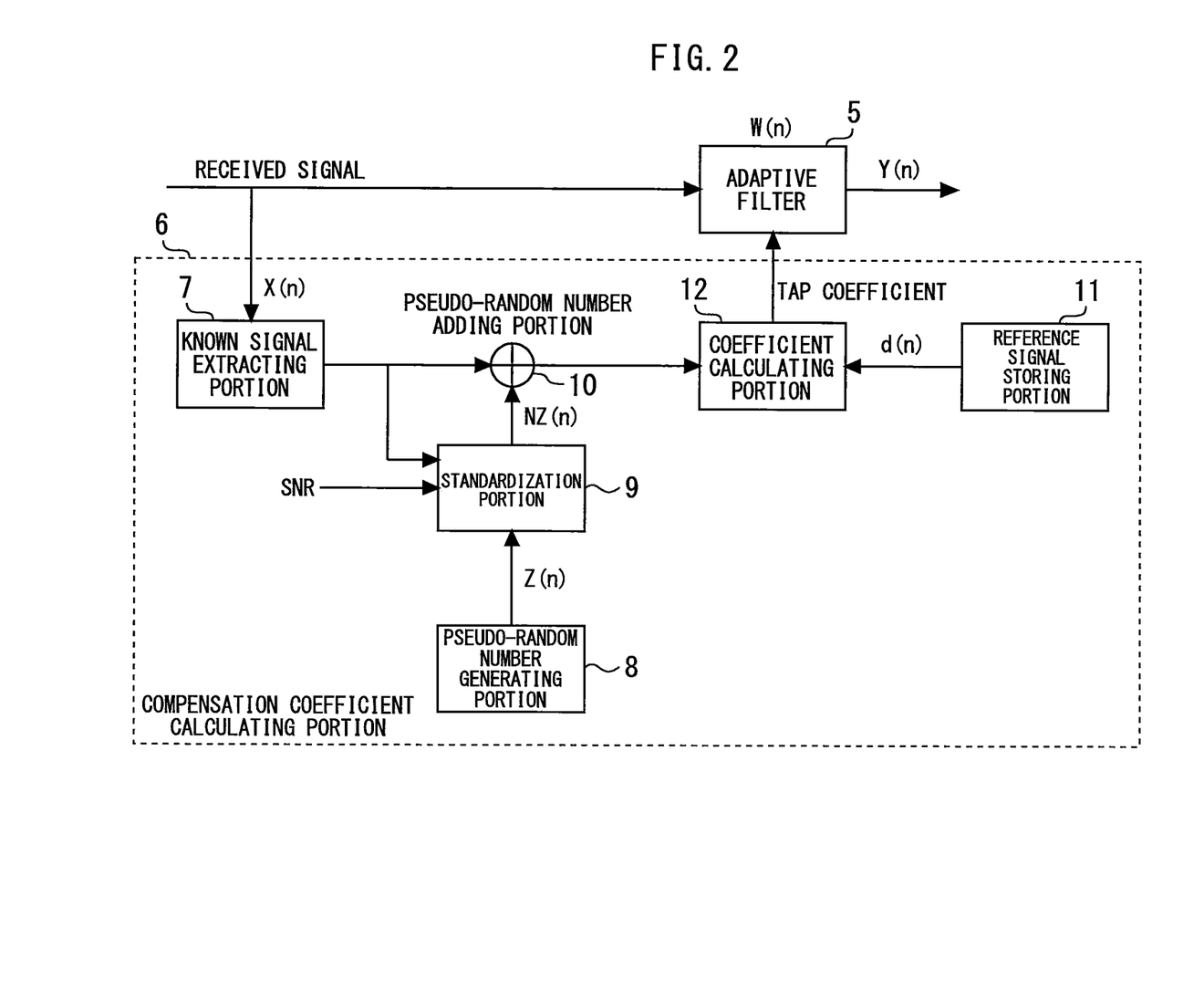
FIG. 2 is a diagram showing the adaptive equalization apparatus according to the first embodiment of the present invention.

FIG. 2 is a diagram showing the adaptive equalization apparatus according to the first embodiment of the present invention. An adaptive filter 5 is a compensation portion which compensates for transmission characteristics of a received signal and includes an FIR filter. A compensation coefficient of this adaptive filter 5 is calculated by a compensation coefficient calculating portion 6. In the compensation coefficient calculating portion 6, a known signal extracting portion 7 extracts a known signal from a received signal. As the known signal, a continuous known pattern configured with a plurality of symbols in a relatively long cycle ("long cycle/continuous known pattern"; hereinafter referred to as an "LP") is used. For example, as the LP, several hundred known symbols (for example, 128 symbols, 256 symbols, 512 symbols or the like) are added to a packet or an OTU (Optical-channel Transport Unit; tens of thousands of symbols) frame of a transmission signal at a rate of once or several times.

A pseudo-random number generating portion 8 generates pseudo-random numbers Z(n) according to Gaussian distribution. Specifically, uniformly distributed random numbers are generated and then Gaussian-distributed using a Box-Muller method. For example, if $\alpha$ and $\beta$ are assumed to be uniformly distributed random numbers, random numbers Z1 and Z2 according to Gaussian distribution are obtained from the following equations.

$$Z1 = \sqrt{-2\log\alpha}\cos(2\pi\beta)$$
$$Z2 = \sqrt{-2\log\alpha}\sin(2\pi\beta) \qquad \text{[Math. 1]}$$

The uniformly distributed random numbers can be easily obtained by using random numbers corresponding to a predetermined number of bits from a pseudo-random bit sequence PRBS (for example, the 23rd or 31st row). Further, in the case of configuring the random numbers by software, a function of generating random data is included among tools of the software, and the function can be used.

Figure 3:
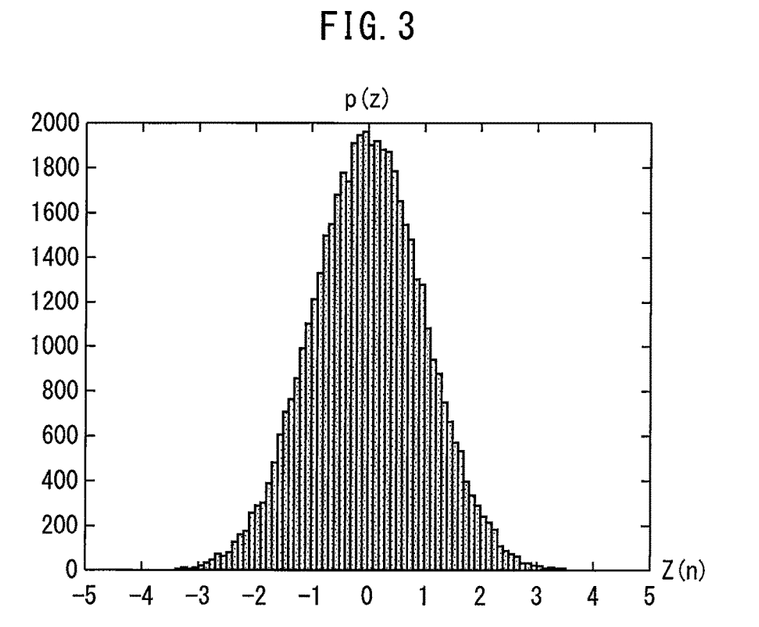
FIG. 3 is a diagram showing distribution of Z1.

FIG. 3 is a diagram showing distribution of Z1. It is seen that Z1 is according to Gaussian distribution. Probability density distribution p(z) of Z1 and Z2 can be expressed by the following equation.

$$p(Z1, Z2) = \frac{1}{\sigma\sqrt{2\pi}}\exp\left[-\frac{Z1^2 + Z2^2}{2\sigma^2}\right] \qquad \text{[Math. 2]}$$

Here, $\sigma^2$ indicates variance of the Gaussian distribution. Here, when $0 \leq \alpha$ and $\beta \leq 1$ are satisfied, p(Z1, Z2) is standard Gaussian distribution with a mean of 0 and a variance of 1.

A standardization portion 9 regards pseudo-random numbers as noise and standardizes magnitude of the pseudo-random numbers Z(n) so that a set SN is obtained. That is, the standardization portion 9 specifies the variance $\sigma^2$ of Gaussian distribution so that a ratio between average power of the known signal of the received signal and average power of the pseudo-random numbers Z(n) becomes an S/N (a signal-to-noise ratio) given from outside to standardize the magnitude of the pseudo-random numbers Z(n) as shown by the following equation.

$$\frac{S}{N} = \frac{\text{average power of known signal}}{\text{power of pseudo-random number}} = \qquad \text{[Math. 3]}$$

-continued $$\frac{Ave(\text{strength of known signal}^2)}{\text{variance of Gaussian distribution } \sigma^2}$$

Here, Ave (strength of known signal$^2$) indicates a mean square value of the strength (voltage) of the known signal. Further, the average power of the Gaussian-distributed pseudo-random numbers is indicated by a square of standard deviation σ.

In the case of the standard Gaussian distribution (the mean of 0 and the variance of $\sigma^2$), standardized pseudo-random numbers NZ are expressed by the following equations in which each of Z1 and Z2 is multiplied by σ.

$$NZ1 = \sigma\sqrt{-2\log\alpha}\cos(2\pi\beta)$$

$$NZ2 = \sigma\sqrt{-2\log\alpha}\sin(2\pi\beta) \qquad \text{[Math. 4]}$$

At this time, power of each of the above pseudo-random numbers NZ is $\sigma^2$. Here, σ for standardizing the pseudo-random numbers Z to be NZ is determined from the mean square value of the strength of the known signal and the S/N given from outside as shown by the following equation.

$$\sigma = [Ave(\text{square of strength of known signal})/(S/N)]^{(1/2)}$$

A pseudo-random number adding portion 10 adds the standardized pseudo-random numbers NZ(n) to the known signal which has been extracted. Either NZ1 or NZ2 can be used. Though values which have been converted from uniform distribution to Gaussian distribution are used as pseudo-random numbers in the above description, the distribution is not limited to Gaussian distribution, but similar distribution or the uniform distribution may be used.

In a reference signal storing portion 11, a true value of an LP inserted into a data signal on the transmission side is stored as a reference signal in advance. The reference signal has a phase which the LP should originally take.

A coefficient calculating portion 12 calculates the compensation coefficient of the adaptive filter 5 by comparing the known signal to which the pseudo-random numbers are added with the reference signal. Specifically, the coefficient calculating portion 12 calculates such a tap coefficient of the adaptive filter 5 that a mean square of an error e(n) between an output of the adaptive filter 5 and the reference signal becomes the smallest, using a minimal mean square error method algorithm. Similarly to a conventional MSE algorithm, the tap coefficient can be determined by the following equation.

$$W(n) = ((X(n)+NZ)^T(X(n)+NZ))^{-1}(X(n)+NZ)^T d(n)$$

Here, W(n) indicates the tap coefficient of the adaptive filter 5; X(n) indicates a received signal; T indicates a transposed matrix; and d(n) indicates the reference signal.

Figure 4:
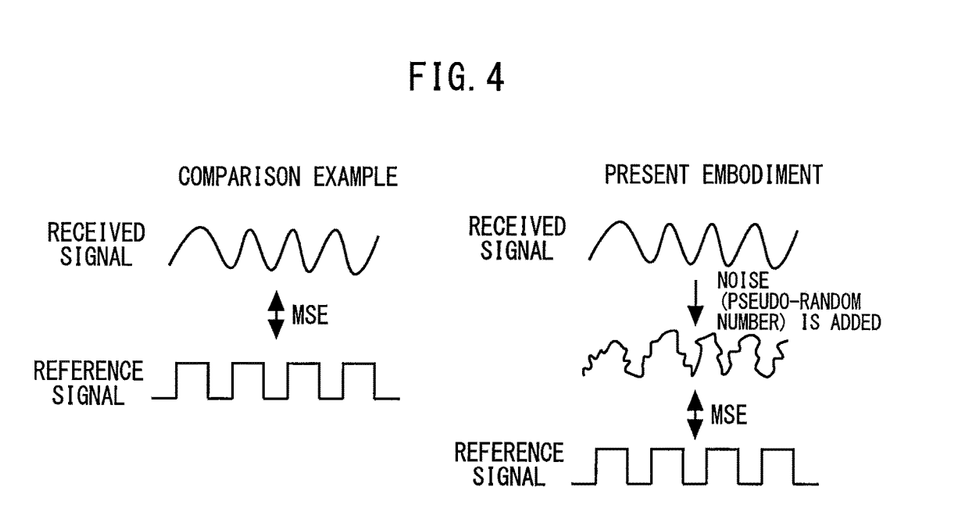
FIG. 4 is a diagram showing a case where pseudo-random numbers are not added to a received signal (a comparison example) and a case where pseudo-random numbers are added (the present embodiment).

FIG. 4 is a diagram showing a case where pseudo-random numbers are not added to a received signal (a comparison example) and a case where pseudo-random numbers are added (the present embodiment). This figure shows a picture of adding pseudo-random numbers to a signal without noise for the purpose of description and does not necessarily accurately show a state where actual pseudo-random numbers are added. In the case of calculating a tap coefficient of a filter in an MSE algorithm as described above, it is possible to prevent divergence at the time of determining an inverse matrix, by adding pseudo-random numbers to a received signal. It is thought that this is because, in internal calculation, a value of a denominator is prevented from being very small at the time of performing division. Though other reasons are, of course, included, its effectiveness is confirmed in actual calculation.

As described above, in the present embodiment, by adding pseudo-random numbers to a known signal, a minimum error from a true value of the known signal becomes finite, and divergence in calculation can be prevented. Therefore, it is possible to certainly calculate a compensation coefficient for compensating for transmission characteristics of a signal and improve equalization accuracy.

Figure 5:
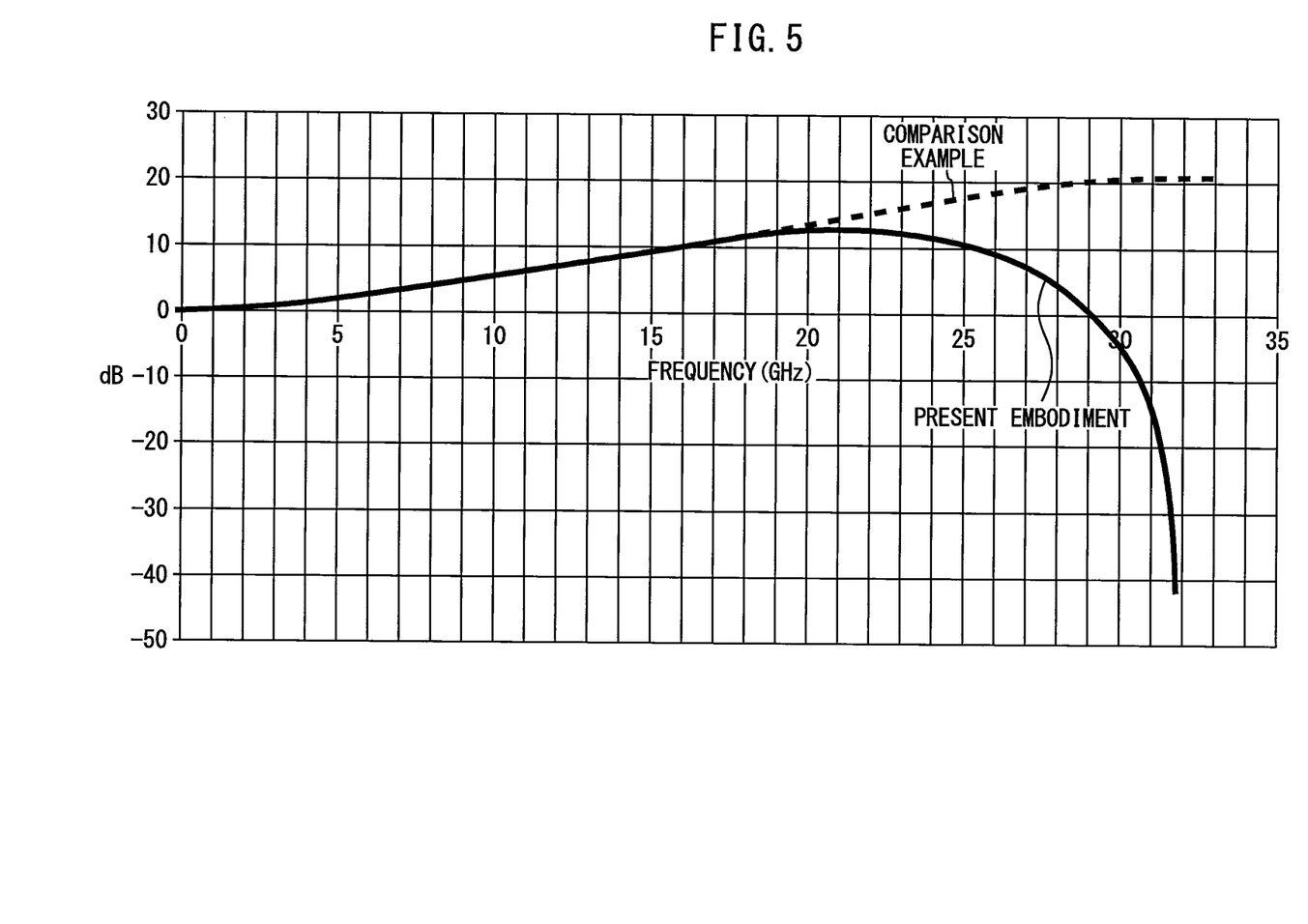
FIG. 5 is a diagram in which frequency characteristics are compared between a case where a tap coefficient is calculated in the method of the first embodiment of the present invention and a case where a tap coefficient is calculated in the method of the comparison example.

FIG. 5 is a diagram in which frequency characteristics are compared between a case where a tap coefficient is calculated in the method of the first embodiment of the present invention and a case where a tap coefficient is calculated in the method of the comparison example. In standardization of pseudo-random numbers of the present embodiment, SNR=10 dB is assumed. Though an unnecessary high-frequency component equal to or above 20 GHz increases in the conventional method, the unnecessary high-frequency component equal to or above 20 GHz can be significantly reduced in the method of the present embodiment. A rate of reducing such a high-frequency component can be controlled by changing an SNR set for the standardization portion 9.

Second Embodiment

Figure 6:
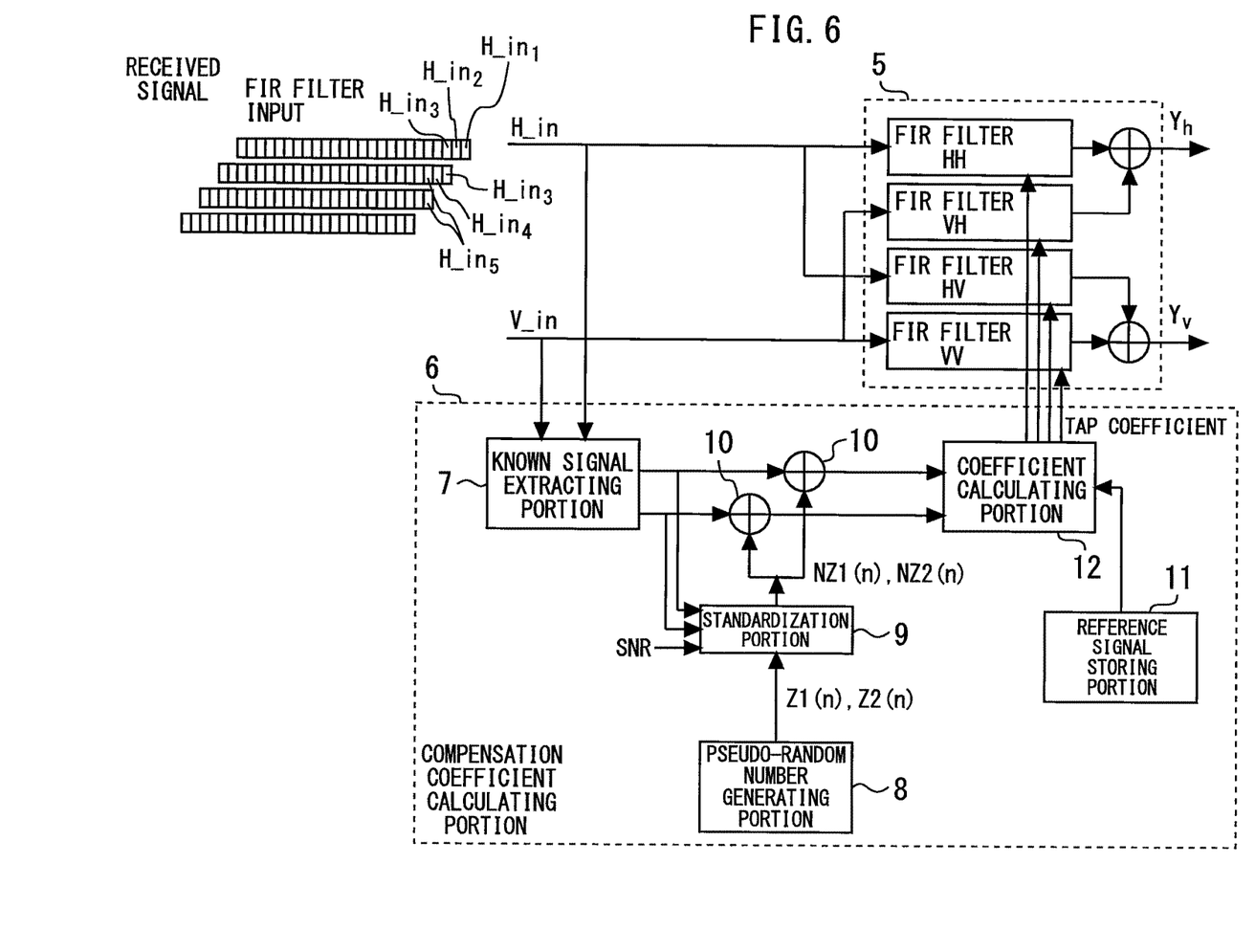
FIG. 6 is a diagram showing an adaptive equalization apparatus according to a second embodiment of the present invention.

FIG. 6 is a diagram showing an adaptive equalization apparatus according to a second embodiment of the present invention. In a case where an optical signal is separated into a horizontally polarized wave and a vertically polarized wave, and compensation is performed on each of the polarized waves by the adaptive filter 5, the adaptive filter 5 has a butterfly type filter to cope with influence by crosstalk between the polarized waves.

The butterfly type filter is configured with four n-stage FIR filters. An output $Y_h$ of a horizontally polarized wave component of the adaptive filter 5 and an output $Y_v$ of a vertically polarized wave component are expressed by the following equations.

$$Y_h = [X][H] = [\text{H\_in} \quad \text{V\_in}]\begin{bmatrix} HH \\ VH \end{bmatrix} \qquad \text{[Math. 5]}$$

$$Y_v = [X][V] = [\text{H\_in} \quad \text{V\_in}]\begin{bmatrix} HV \\ VV \end{bmatrix}$$

Here, HH, VH, HV and VV indicate tap coefficients of the four FIR filters, respectively; H_in indicates an input of a horizontally polarized wave to the adaptive filter 5; and V_in indicates an input of a vertically polarized wave.

Here, HH, VH, HV and VV are indicated by $HH_1$ to $HH_n$, $VH_1$ to $VH_n$, $HV_1$ to $HV_n$, and $VV_1$ to $VV_n$, respectively; H_in is indicated by a sampling data string $H\_in_1$, $H\_in_2$, ..., and V_in is indicated by a sampling data string $V\_in_1$, $V\_in_2$, .... Outputs Yh and Yv at the time when the sampling data strings are inputted to the butterfly type filter, respectively, are expressed by the following equations.

$$\begin{bmatrix} Y_{h1} \\ Y_{h2} \\ Y_{h3} \\ \vdots \\ \vdots \\ \vdots \\ \vdots \\ Y_{hM} \end{bmatrix} = \begin{bmatrix} H\_in_1 & H\_in_2 & H\_in_3 & \ldots & H\_in_n & V\_in_1 & V\_in_2 & V\_in_3 & \ldots & V\_in_n \\ H\_in_3 & H\_in_4 & H\_in_5 & \ldots & H\_in_{n+2} & V\_in_3 & V\_in_4 & V\_in_5 & \ldots & V\_in_{n+2} \\ H\_in_5 & H\_in_6 & H\_in_7 & \ldots & H\_in_{n+4} & V\_in_5 & V\_in_6 & V\_in_7 & \ldots & V\_in_{n+4} \\ \vdots & \vdots & \vdots & & \vdots & \vdots & \vdots & \vdots & & \vdots \\ H\_in_{L-n+1} & H\_in_{L-n+2} & H\_in_{L-n+3} & \ldots & H\_in_L & V\_in_{L-n+1} & V\_in_{L-n+2} & V\_in_{L-n+3} & \ldots & V\_in_L \end{bmatrix} \times \begin{bmatrix} HH_1 \\ HH_2 \\ HH_3 \\ \vdots \\ HH_n \\ VH_1 \\ VH_2 \\ VH_3 \\ \vdots \\ VH_n \end{bmatrix}$$

[Math. 6]

$$\begin{bmatrix} Y_{v1} \\ Y_{v2} \\ Y_{v3} \\ \vdots \\ \vdots \\ \vdots \\ \vdots \\ Y_{vM} \end{bmatrix} = \begin{bmatrix} H\_in_1 & H\_in_2 & H\_in_3 & \ldots & H\_in_n & V\_in_1 & V\_in_2 & V\_in_3 & \ldots & V\_in_n \\ H\_in_3 & H\_in_4 & H\_in_5 & \ldots & H\_in_{n+2} & V\_in_3 & V\_in_4 & V\_in_5 & \ldots & V\_in_{n+2} \\ H\_in_5 & H\_in_6 & H\_in_7 & \ldots & H\_in_{n+4} & V\_in_5 & V\_in_6 & V\_in_7 & \ldots & V\_in_{n+4} \\ \vdots & \vdots & \vdots & & \vdots & \vdots & \vdots & \vdots & & \vdots \\ H\_in_{L-n+1} & H\_in_{L-n+2} & H\_in_{L-n+3} & \ldots & H\_in_L & V\_in_{L-n+1} & V\_in_{L-n+2} & V\_in_{L-n+3} & \ldots & V\_in_L \end{bmatrix} \times \begin{bmatrix} HV_1 \\ HV_2 \\ HV_3 \\ \vdots \\ HV_n \\ VV_1 \\ VV_2 \\ VV_3 \\ \vdots \\ VV_n \end{bmatrix}$$

In the case of performing sampling twice per symbol to acquire sampling data, data is set for the FIR filters for each sampling, but, as for timing of input to the filters, it is efficient to perform input per symbol. Therefore, at the next timing, data is inputted every two samplings.

The known signal extracting portion 7 extracts an LP from each of the horizontally polarized wave input H_in and the vertically polarized wave input V_in. The pseudo-random number adding portion 10 adds standardized pseudo-random numbers NZ1(n) and NZ2(n) to the extracted LPs of the horizontally polarized wave input and the vertically polarized wave input, respectively. A reference signal $LP_h$ for an LP of a horizontally polarized wave and a reference signal $LP_v$ for an LP of a vertically polarized wave are stored in the reference signal storing portion 11 in advance.

The coefficient calculating portion 12 determines such filter coefficients of the butterfly type filter that errors between received signals of the LPs to which the pseudo-random numbers are added, and the reference signals $LP_h$ and $LP_v$, respectively, become the smallest. The filter coefficients are calculated by substituting $Y_h=LP_h$ and $Y_v=LP_v$ into the above equations. Therefore, $[X][H]=[LP_h]$ is calculated as shown below.

$$\begin{bmatrix} H\_in_1 + NZ1(1) & H\_in_2 + NZ2(1) & H\_in_3 + NZ1(2) \ldots & H\_in_n + NZ2(n/2) \\ H\_in_3 + NZ1(2) & H\_in_4 + NZ2(2) & H\_in_5 + NZ1(3) \ldots & H\_in_{n+2} + NZ2(n/2+1) \\ H\_in_5 + NZ1(3) & H\_in_6 + NZ2(3) & H\_in_7 + NZ1(4) \ldots & H\_in_{n+4} + NZ2(n/2+2) \\ \vdots & \vdots & \vdots & \vdots \\ H\_in_{L-n+1} + & H\_in_{L-n+2} + & H\_in_{L-n+3} + & H\_in_L + \\ NZ1((L-n+1)/2) & NZ2((L-n+1)/2) & NZ1((L-n+1)/2+1) \ldots & NZ2(n/2+L-n) \end{bmatrix}$$

[Math. 7]

$$\begin{bmatrix} V\_in_1 + NZ1(1) & V\_in_2 + NZ2(1) & V\_in_3 + NZ1(2) \ldots & V\_in_n + NZ2(n/2) \\ V\_in_3 + NZ1(2) & V\_in_4 + NZ2(2) & V\_in_5 + NZ1(3) \ldots & V\_in_{n+2} + NZ2(n/2+1) \\ V\_in_5 + NZ1(3) & V\_in_6 + NZ2(3) & V\_in_7 + NZ1(4) \ldots & V\_in_{n+4} + NZ2(n/2+2) \\ \vdots & \vdots & \vdots & \vdots \\ V\_in_{L-n+1} + & V\_in_{L-n+2} + & V\_in_{L-n+3} + & V\_in_L + \\ NZ1((L-n+1)/2) & NZ2((L-n+1)/2) & NZ1((L-n+1)/2+1) \ldots & NZ2(n/2+L-n) \end{bmatrix} \times \begin{bmatrix} HH_1 \\ HH_2 \\ HH_3 \\ \vdots \\ HH_n \\ VH_1 \\ VH_2 \\ VH_3 \\ \vdots \\ VH_n \end{bmatrix} = \begin{bmatrix} LP_{h1} \\ LP_{h2} \\ LP_{h3} \\ \vdots \\ \vdots \\ \vdots \\ \vdots \\ LP_{hM} \end{bmatrix}$$

Here, $[X][V]=[LP_v]$ is also similarly calculated.

Here, the standardized pseudo-random numbers NZ1 are added to odd-numbered data of the sample data string, and the standardized pseudo-random numbers NZ2 are added to even-numbered data of the sample data string. This is for the purpose of increasing randomness more and improving certainty of convergence and prevention of increase in a high-frequency range in the MSE algorithm. The above equations merely show an example of addition of the pseudo-random numbers NZ. If randomness is secured, a method is not limited to the above method, and it is not necessary to separately use NZ1 and NZ2. Further, variables may be arbitrary. Further, the pseudo-random numbers to be added may be either the same or different between a received signal of a horizontally polarized wave and a received signal of a vertically polarized wave.

In the MSE algorithm of the present embodiment, mean square errors (MSE) are expressed by the following equations.

$$e_h = \|X \cdot H - LP_h\|^2, \ e_v = \|X \cdot V - LP_v\|^2 \quad \text{[Math. 8]}$$

Furthermore, the tap coefficients at the time when the mean square errors are the smallest are determined by the following equations.

$$H = (X^H X)^{-1} X^H LP_h, \ V = (X^H X)^{-1} X^H LP_v$$

Here, pseudo-random numbers are added to sample data of a received signal X.

As described above, in the present embodiment, the adaptive filter 5 has a butterfly type filter, and compensation coefficients are tap coefficients of the butterfly type filter. Thus, in the case of applying the present invention to calculation of filter coefficients of an adaptive equalization filter for receiving double polarized waves also, it is possible to certainly calculate compensation coefficients for compensating for transmission characteristics and improve equalization accuracy similarly to the case of an adaptive equalization filter for receiving single polarized wave.

Third Embodiment

Figure 7:
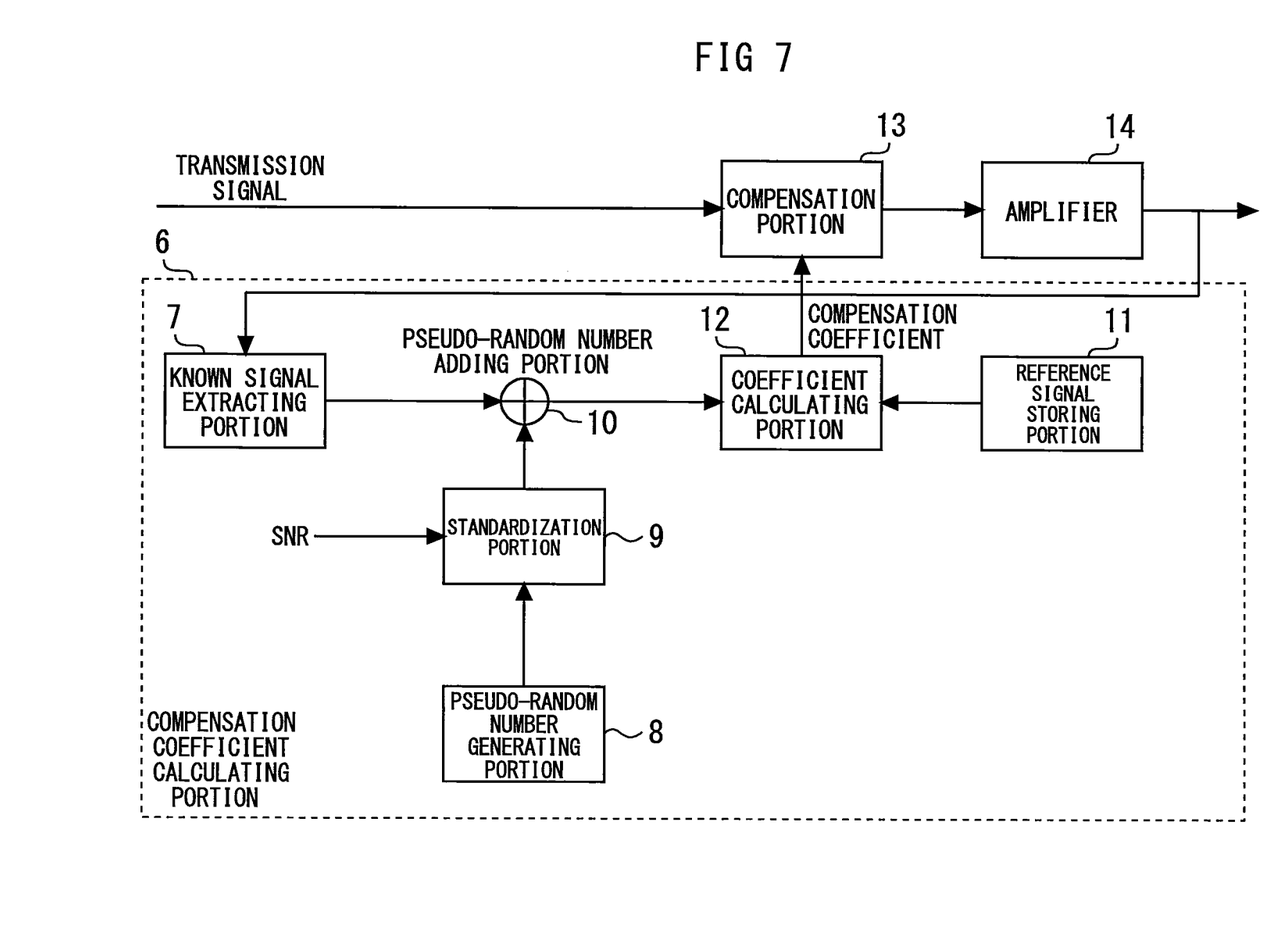
FIG. 7 is a diagram showing a transmission apparatus according to a third embodiment of the present invention.

FIG. 7 is a diagram showing a transmission apparatus according to a third embodiment of the present invention. The present embodiment is a configuration example in which the compensation coefficient calculation method of the present invention is applied to a transmission apparatus. A compensation portion 13 has a function of compensating for transmission characteristics of the transmission apparatus. An amplifier 14 amplifies an output of the compensation portion 13.

An output of the amplifier 14 is fed back and inputted to the known signal extracting portion 7. Other components and operations are similar to those of the first and second embodiments in which the present invention is applied to a reception circuit. Thus, in the case of applying the present invention to a transmission circuit also, it is possible to certainly calculate a compensation coefficient for compensating for transmission characteristics and improve equalization accuracy without divergence in an MSE algorithm.

A program for implementing the compensation coefficient calculation method according to the first to third embodiment may be recorded in a computer-readable recording medium so that the program recorded in the recording medium is read in and executed by a computer system or a programmable logic device to perform the compensation coefficient calculation. The "computer system" described here may contain hardware such as OS, peripheral equipment, etc. The "computer system" may contain a WWW system having a homepage providing environment (or displaying environment). The "computer-readable recording medium" may be a portable medium such as a flexible disc, a magneto-optic disc, ROM and CD-ROM, or a storage device such as a hard disc incorporated in a computer system. Furthermore, the "computer-readable recording medium" may contain an element for holding a program for a constant time like a volatile memory (RAM) in a computer system serving as a server or a client when a program is transmitted through a network such as the Internet or a communication line such as a telephone line. The program may be transmitted from a computer system having a storage device or the like in which the program is stored, to another computer system via a transmission medium or by transmission waves in a transmission medium. Here, the "transmission medium" for transmitting the program is a medium having a function of transmitting information like a network (communication network) such as the Internet or a communication circuit (communication line) such as a telephone line or the like. The program may be provided to perform a part of the foregoing function. Furthermore, the program may be provided to perform the foregoing function in combination with a program which has been already stored in the computer system, so-called a differential file (differentia program).

REFERENCE SIGNS LIST 5 adaptive filter; 6 compensation coefficient calculating portion; 7 known signal extracting portion; 8 pseudo-random number generating portion; 9 standardization portion; 10 pseudo-random number adding portion; 11 reference signal storing portion; 12 coefficient calculating portion; 13 compensation portion

The invention claimed is:

1. A compensation coefficient calculation method performed by a receiver receiving and converting an optical signal to a received signal which is an electrical signal, comprising:
    receiving the optical signal to which a known signal is added, converting the optical signal into the received signal, and extracting the known signal from the received signal;
    adding a pseudo-random number to the extracted known signal; and
    calculating a compensation coefficient of compensation circuitry configured to equalize transmission characteristics of the received signal by comparing a true value of the known signal with the known signal to which the pseudo-random number is added.

2. The compensation coefficient calculation method according to claim 1, wherein the known signal is a long cycle/continuous known pattern,
    the compensation circuitry further comprising an FIR filter, and
    the calculating the compensation coefficient further comprising calculating a tap coefficient of the FIR filter based on the long cycle/continuous known pattern by using a minimal mean square error method algorithm.

3. The compensation coefficient calculation method according to claim 2, further comprising:
    generating a pseudo-random number; and
    standardizing a magnitude of the pseudo-random number so that a ratio between average power of the known signal of the signal and average power of the pseudo-random number becomes a predetermined value,
    wherein the standardized pseudo-random number is added to the known signal in the adding the pseudo-random number to the extracted known signal.

4. The compensation coefficient calculation method according to claim 2, wherein the pseudo-random number has Gaussian distribution.

5. The compensation coefficient calculation method according to claim 2, wherein the compensation circuitry is configured to comprise a butterfly type filter, and the compensation coefficient is a tap coefficient of the butterfly type filter.

6. A compensation coefficient calculation method performed by a transmitter converting a transmission signal which is an electrical signal to an optical signal and transmitting the optical signal, comprising:

extracting a known signal from an output signal of compensation circuitry configured to equalize transmission characteristics of the transmission signal to which the known signal is added;

adding a pseudo-random number to the extracted known signal; and calculating a compensation coefficient of the compensation circuitry by comparing a true value of the known signal with the known signal to which the pseudo-random number is added.

7. The compensation coefficient calculation method according to claim 6, wherein the known signal is a long cycle/continuous known pattern, the compensation circuitry further comprising an FIR filter, and the calculating the compensation coefficient further comprising calculating a tap coefficient of the FIR filter based on the long cycle/continuous known pattern by using a minimal mean square error method algorithm.

8. The compensation coefficient calculation method according to claim 7, further comprising:

generating a pseudo-random number; and standardizing a magnitude of the pseudo-random number so that a ratio between average power of the known signal of the signal and average power of the pseudo-random number becomes a predetermined value, wherein the standardized pseudo-random number is added to the known signal in the adding the pseudo-random number to the extracted known signal.

9. The compensation coefficient calculation method according to claim 7, wherein the pseudo-random number has Gaussian distribution.

10. The compensation coefficient calculation method according to claim 7, wherein the compensation portion is configured to comprise a butterfly type filter, and the compensation coefficient is a tap coefficient of the butterfly type filter.

11. A compensation coefficient calculation method performed by a receiver receiving and converting an optical signal to a received signal which is an electrical signal, comprising:

a step of receiving the optical signal to which a known signal is added, converting the optical signal into the received signal, and extracting the known signal from the received signal;

a pseudo-random number adding step of adding a pseudo-random number to the extracted known signal; and a coefficient calculating step of calculating a compensation coefficient of a compensation portion configured to equalize transmission characteristics of the received signal by comparing a true value of the known signal with the known signal to which the pseudo-random number is added.

* * * * *